United States Patent [19]

Atkinson

[11] Patent Number: 4,931,783
[45] Date of Patent: Jun. 5, 1990

[54] METHOD AND APPARATUS FOR REMOVABLE MENU WINDOW

[75] Inventor: William D. Atkinson, Los Gatos, Calif.

[73] Assignee: Apple Computer, Inc., Cupertino, Calif.

[21] Appl. No.: 224,304

[22] Filed: Jul. 26, 1988

[51] Int. Cl.[5] .............................................. G09G 5/14
[52] U.S. Cl. .................................... 340/710; 340/710; 340/724
[58] Field of Search ............... 340/706, 709, 710, 721, 340/723, 724; 364/521

[56] References Cited

U.S. PATENT DOCUMENTS

| | | | |
|---|---|---|---|
| Re. 32,632 | 3/1988 | Atkinson | 340/710 |
| 4,464,652 | 8/1984 | Lapson et al. | 340/710 |
| 4,586,035 | 4/1986 | Baker et al. | 340/723 |
| 4,686,522 | 8/1987 | Hernandez et al. | 340/709 |
| 4,698,624 | 10/1987 | Baker et al. | 340/706 |
| 4,772,882 | 9/1988 | Mical | 340/721 |
| 4,819,189 | 4/1989 | Kikuchi et al. | 340/723 |
| 4,901,752 | 10/1989 | Wang | 340/724 |

OTHER PUBLICATIONS

Callahan et al.; "An Empirical Comparison of Pie vs. Linear Menus"; CS-TR-1919, Department of Computer Science, University of Maryland; Sep. 1987; pp. 1-14.

Primary Examiner—Alvin Oberley
Assistant Examiner—M. Fatahiyar
Attorney, Agent, or Firm—Blakely, Sokoloff, Taylor & Zafman

[57] ABSTRACT

A method and apparatus for removing a menu window from a menu bar on a display device in a computer controlled display system is described. The menu window is removed from the menu bar by positioning the cursor on a display device over a command option on the menu bar and then by manipulating a signal generating device to indicate to the computer display system that the user has selected the command option and then by manipulating a cursor control device to cause the cursor to cross a border of the menu window while the menu window is being displayed.

12 Claims, 5 Drawing Sheets

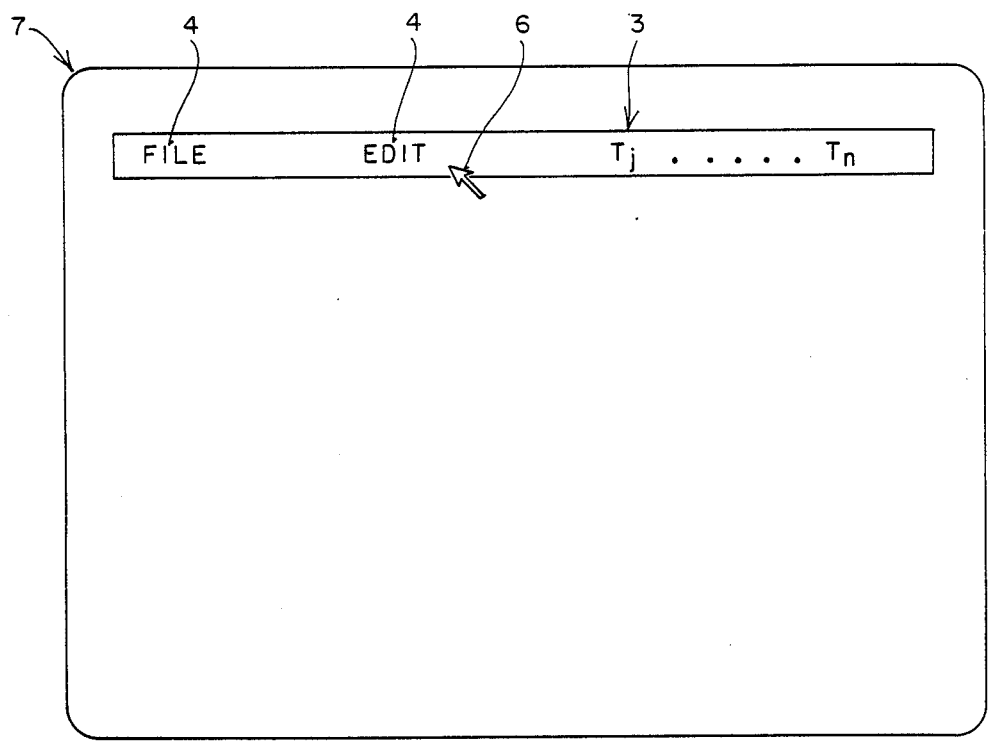
FIG_1A
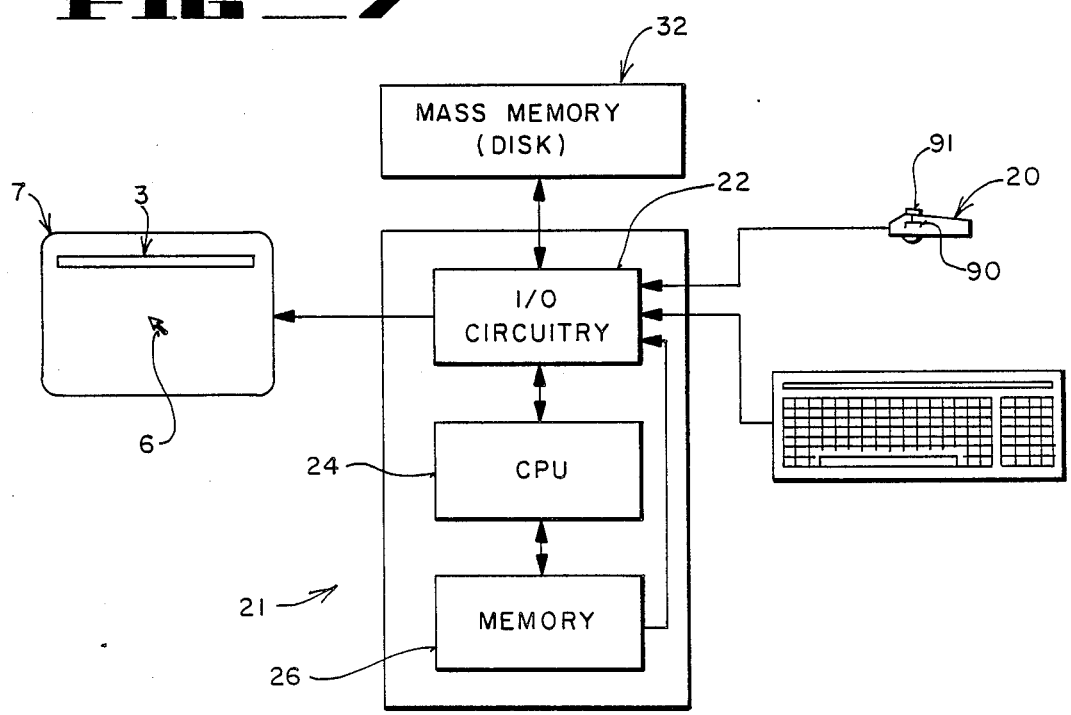
FIG_7

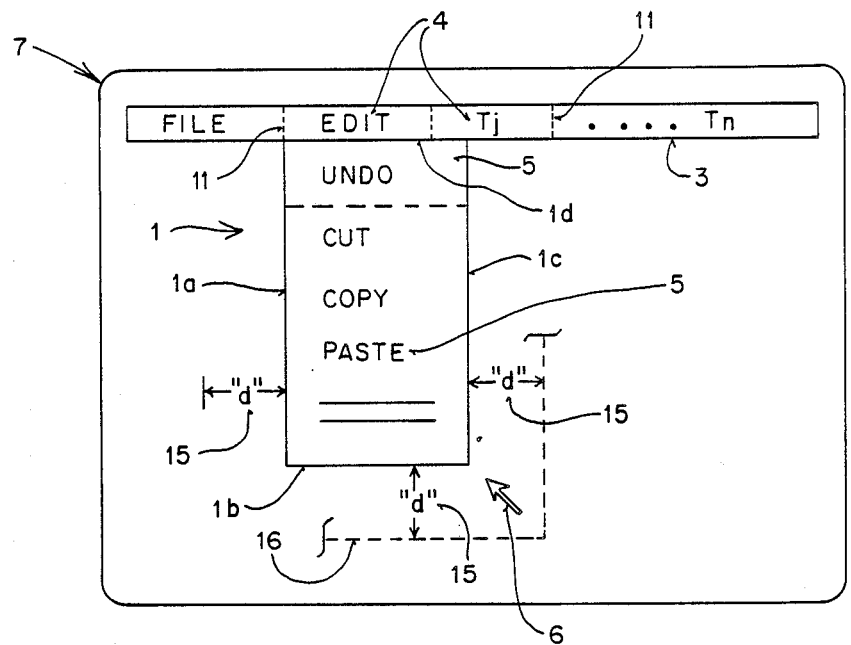
FIG_1B
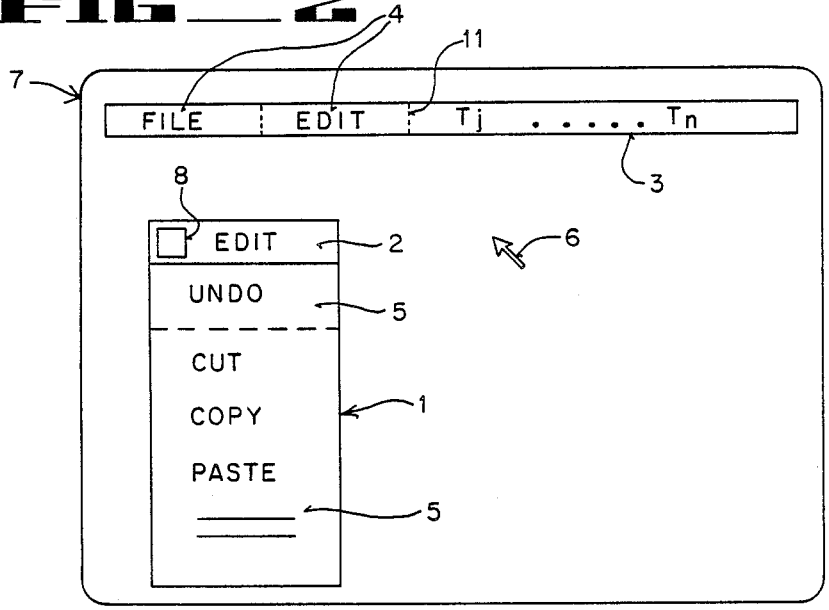
FIG_2
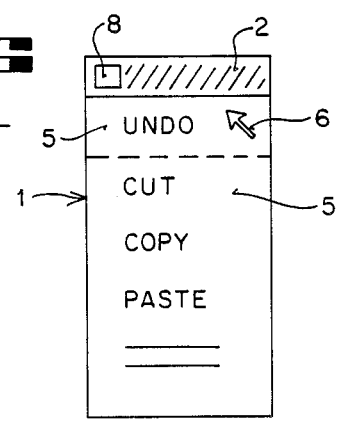
FIG_3A
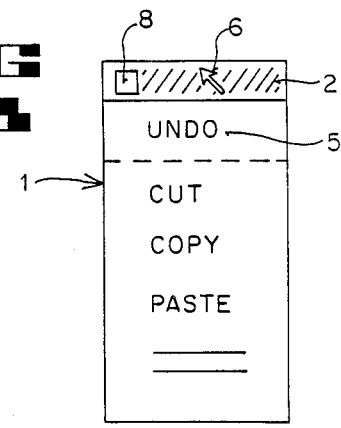
FIG_3B

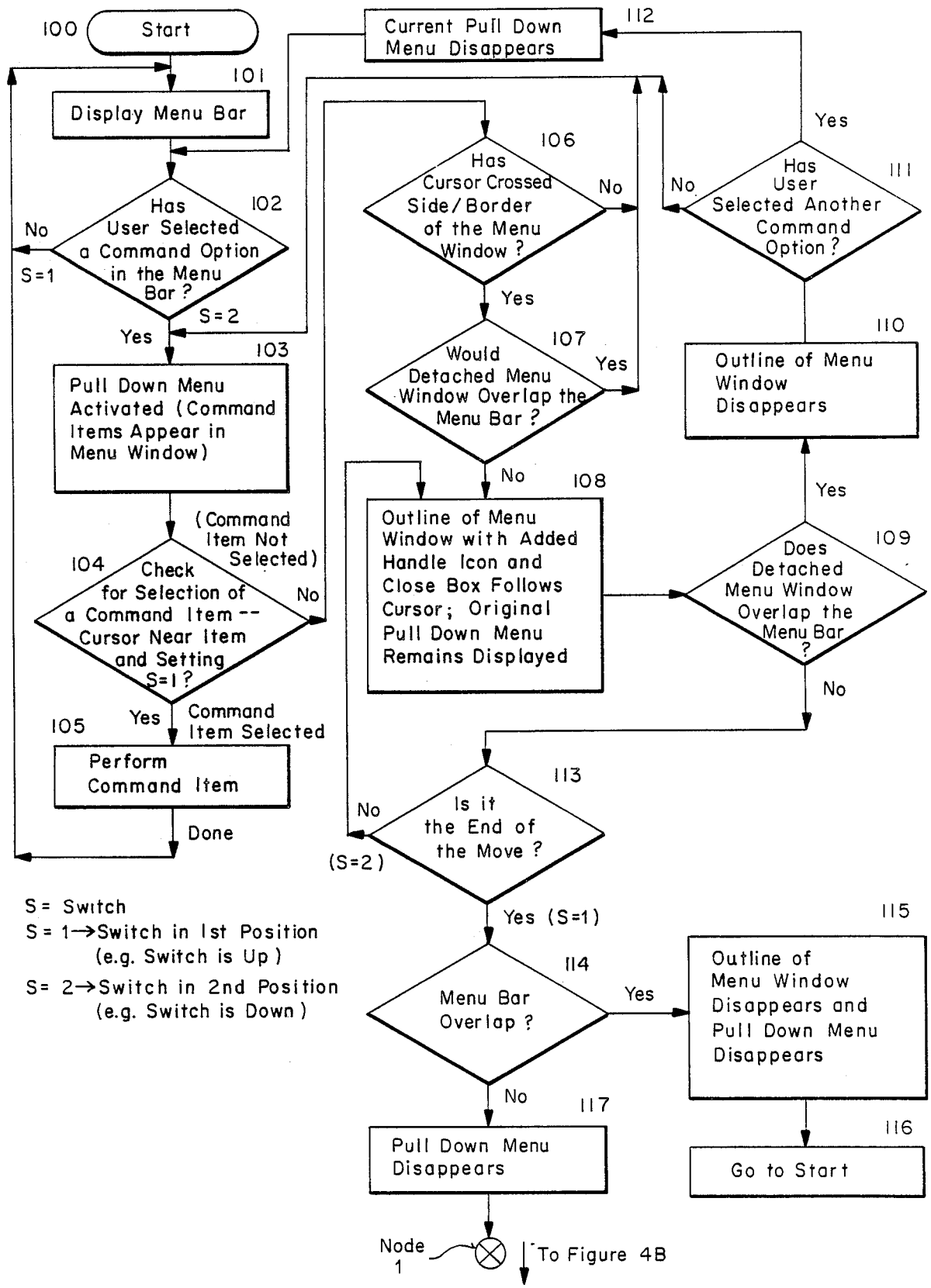
FIG_4A

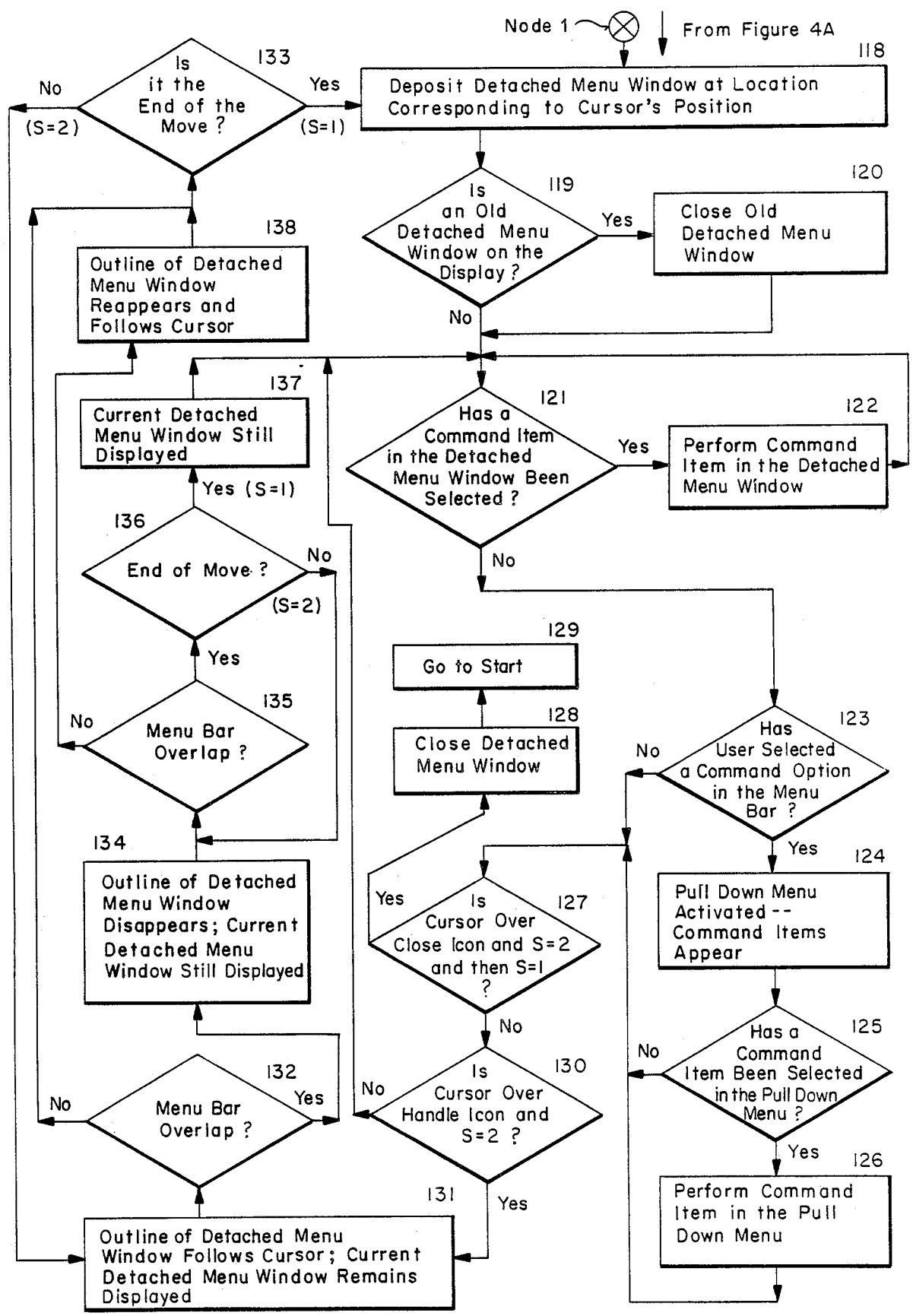
FIG_4B.

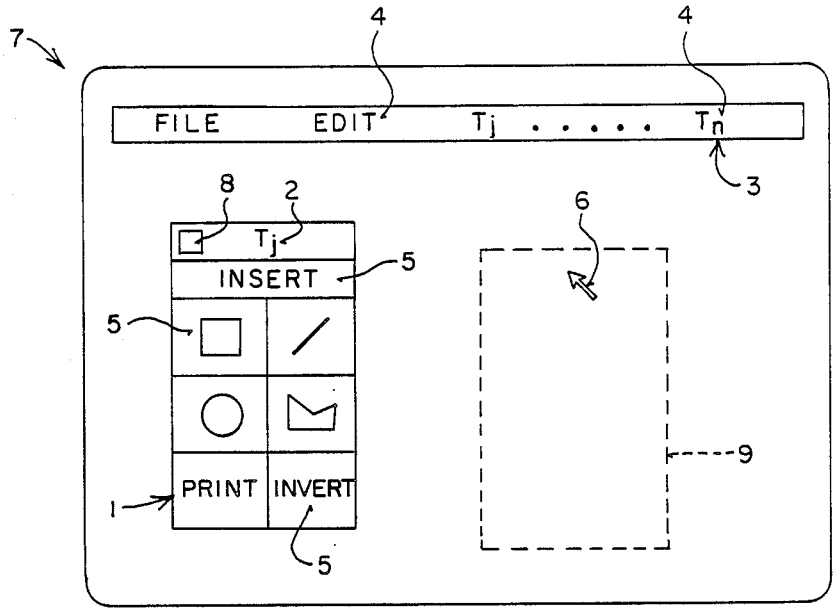
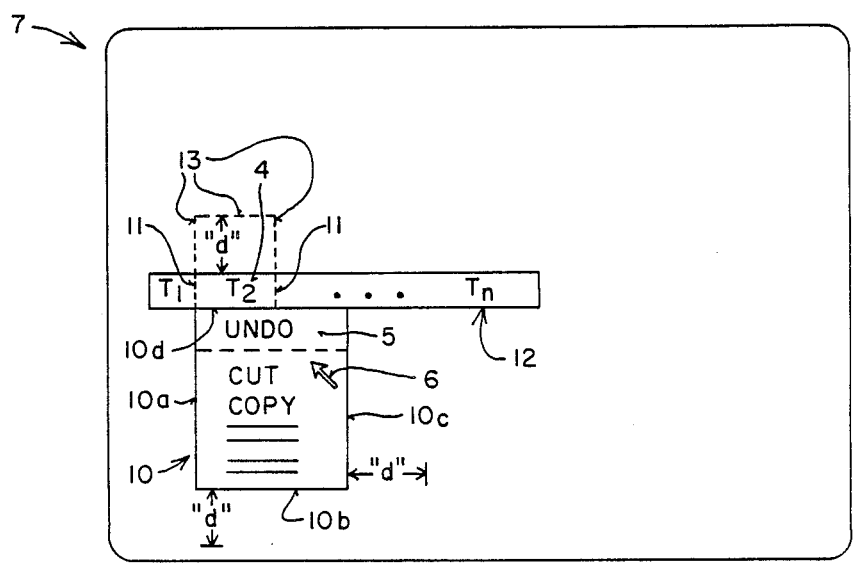

METHOD AND APPARATUS FOR REMOVABLE MENU WINDOW

BACKGROUND OF THE INVENTION

A. Field of the Invention

The present invention relates to the field of computer controlled display systems for use in a computer system. More particularly, the field of the invention relates to computer systems that include menus, such as pull-down menus, which are displayed on a video screen controlled by a computer system.

B. Prior Art Background

Many prior art computer systems include computer controlled display systems which utilize bit-mapped displays which typically present a graphic image to the user of the computer system. In these computer controlled display systems, a bit-mapped image appears on a display means, such as a cathode ray tube (CRT); the bit-mapped image is typically generated and stored in a frame buffer which acts as a memory for the display system. In these display systems, the user typically interacts with the computer system by manipulating a cursor control means, such as a mouse. The user uses the mouse to position a cursor on the bit-mapped image to select options which are displayed under the control of the computer system on the display means. An example of such a prior art computer system is the Macintosh series of computers produced and offered by Apple Computer, Inc. of Cupertino, California. An exemplary description of bit-mapped computer controlled display systems may be found in U.S. Pat. No. 4,622,545, which is assigned to the assignee of the instant invention.

A typical prior art computer controlled display system is described in U.S. Pat. No. 4,464,652, which has been reissued as U.S. Pat. No. Re. 32,632. In the display system described in that patent, a mouse is coupled to the computer display system to control selectively the position of a cursor on a display means, such as a computer screen simply by moving the mouse over a surface, such as a desk, until the desired cursor position is shown on the display screen. The display system described in U.S. Pat. No. Re. 32,632 includes a "pull-down" menu. The mouse described in that patent includes a switch means which is utilized with the positioning of the cursor on the screen to selectively display command items corresponding to a particular command option (sometimes referred to as a menu title) which appears along a menu bar on the screen (display means). The command items are displayed in a menu window which is typically immediately below the command option which has been selected. That command option is selected by placing the cursor on or near the command option and setting the switch on the mouse to a second position, thereby causing the menu window to be displayed. If the user wishes to make a selection of one of the items in the menu window, the user continues to drag the mouse and thereby the cursor, down the menu window until the cursor appears over or near the particular command item the user wishes to select. The user then releases the switch means to thereby set the switch in a first position, which instructs the computer to execute the command item selected.

While this prior art display system employing pull-down menus has met with considerable success, the pull-down menu which is produced by this method frequently obscures portions of the images on the display means when the user would like to see those portions (e.g. to determine what selection to make in the pull-down menu). That is, since the pull-down window generates a menu window which is typically in a fixed position, any images near that fixed position are frequently obscured by a menu window when it is generated by the foregoing techniques. Moreover, the menu window generated through these pull-down menu techniques is accessible only when a command option has been selected. In other words, the command items present in a particular menu window are not accessible until a command option has been selected.

The present invention provides an improved computer controlled display system in which the menu windows may be removed from the menu bar and positioned on the screen of the display means. Once the menu window has been removed from the menu bar, the menu window may be repositioned on the screen of the display means or may be closed and thereby removed from the screen.

SUMMARY OF THE INVENTION

The computer controlled display system of the invention provides an interface for a user to provide information, including instructions, to a computer system. The computer controlled display system includes a display means which has a plurality of command options along a menu bar, typically near the top of the display means. Each command option has command items corresponding to that command option which are displayed within a menu window when that particular command option is selected. Each menu window includes a border, which typically corresponds to the sides of the menu window. A cursor control means, such as a mouse, is used to control the cursor's position on the display means; the cursor control means is typically coupled to the computer controlled display system. The manipulation (e.g. movement) of the cursor control means by the user results in a corresponding movement of the cursor on the display means. Hence, the user manipulates the cursor control means to produce a movement of the cursor on the display means. A signal generation means (e.g. a switch means, such as a button or several buttons) is coupled to the computer controlled display system. A signal generation means may have a first and a second position (e.g. button up and button down, respectively) which the user may use to signal to the computer the instructions from the user. The menu window is removed from the menu bar while the menu window is displayed by manipulating the cursor control means so as to move the cursor across the border of the menu window while signaling via the signal generation means to the computer that the user desires to remove the menu window.

The method of the invention for removing a menu window from the menu bar comprises several steps. The menu bar is displayed by a computer controlled display system and typically includes several command options which are displayed along the menu bar. The command option is selected by positioning the cursor on the display, using the cursor control means, in the vicinity of the command option being selected and then by using the signal generation means to signal to the computer that the command option is being selected by the user. Once a particular command option has been selected, the command items corresponding to that command option are displayed in a menu window which includes a border. That is, the menu window (being attached to the menu bar) is displayed by selecting the command option. The menu window is then removed from the menu bar while that menu window is still displayed by manipulating the cursor control means so as to move the cursor across the border of the menu window while signaling to the computer that the menu window is to be removed, thereby removing the menu window from the menu bar.

BRIEF DESCRIPTION OF THE DRAWINGS

FIG. 1a shows a display means of the invention.

FIG. 1b diagrammatically shows the screen of the display means of the invention with a pull-down menu activated.

FIG. 2 shows the computer controlled display system of the invention with a menu window which has been removed from the menu bar.

FIG. 3a shows a removed menu window with the cursor positioned over a command item.

FIG. 3b shows a removed menu window with the cursor positioned over the handle icon.

FIG. 4a is the first part of a flow chart which describes and shows the process of the present invention.

FIG. 4b is the second part of a flow chart which describes and shows the process of the present invention.

FIG. 5 diagrammatically shows the display means of the present invention and further shows a menu window being moved.

FIG. 6 shows an alternative embodiment of the removeable menu window of the invention where the menu bar is positioned near the middle of the display means.

FIG. 7 shows an embodiment of the apparatus of the present invention.

DETAILED DESCRIPTION OF THE INVENTION

A process for removing a menu window from a menu bar on a display means in a computer controlled display system is described. In the following description, specific steps, procedures, command options, command items and other specifics are set forth in order to provide a thorough understanding of the present invention. However, it will be apparent to one skilled in the art that the present invention may be practiced without the specific details. In other instances, well known systems are shown in diagrammatic or block diagram form in order not to obscure in unnecessary detail the present invention.

The computer controlled display system of the present invention is part of a computer system, such as that shown in FIG. 7. The computer controlled display system includes a display means 7, such as a CRT monitor or a liquid crystal display (LCD) and further includes a cursor control means 20, such as a mouse of the type shown in U.S. Pat. No. Re. 32,632. Typically, the cursor control means 20, such as a mouse, includes a signal generation means, such as a switch means having a first position and a second position. For example, the mouse shown and described in U.S. Pat. No. Re. 32,632 includes a switch means 90 which the user of the computer system uses to generate signals directing the computer to execute certain commands. The disclosure in U.S. Pat. No. Re. 32,632 is hereby incorporated by reference since the present invention is particularly pertinent to the computer control display system having a "pull-down" menu bar display which is disclosed in that patent. For the purposes of the present invention, the cursor control means of the present invention may be substantially identical to the cursor control means in U.S. Pat. No. Re. 32,632 (for example, shown as cursor control unit 20 in FIG. 1 of U.S. Pat. No. Re. 32,632). However, it will be understood by those in the art that many other types of cursor control means may be utilized, such as graphic tablets, a mouse with a plurality of switches (i.e. buttons), trackballs, etc. Indeed, any device capable of indicating x-y locations and capable of controlling a cursor on a display means of a computer system may be utilized in the present invention as the cursor control means.

Referring again to FIG. 7, the cursor 6 on the display means 7 is controlled by the cursor control means 20 which is shown in FIG. 7. The cursor control means 20 is coupled to the computer system 21 to permit the user to control the position of the cursor 6 on display means 7. The computer system 21 includes a CPU 24 which is coupled between a memory 26 and I/O circuitry 22 by bidirectional buses. The I/O circuitry 22 is coupled, typically by a bidirectional bus, to a mass memory storage unit 32, such as a disc drive, and the I/O circuitry 22 is also coupled to a keyboard means 30. The I/O circuitry 22 is coupled to the cursor control means 20 and to the display means 7. The I/O circuitry 22 receives data from the cursor control means 20 and the keyboard 30 and provides that data to the CPU 24 and the mass memory 32. The computer system shown in FIG. 7 is well known (e.g. the Macintosh series of computers sold by Apple Computer, Inc.) and hence a detailed description is not necessary herein. A further description of the computer system shown in FIG. 7 may be found in U.S. Pat. No. 4,622,545 (which system is shown in and described with reference to FIG. 1 of U.S. Pat. No. 4,622,545). U.S. Pat. No. 4,622,545 is hereby incorporated by reference herein.

FIG. 1a illustrates the display means 7 when there is no pull-down menu activated; that is, the menu bar 3 has no command options which have been selected and therefore no menu windows appear "pulled-down" from the menu bar 3. As shown in FIG. 1a, the menu bar 3 typically has a plurality of command options 4, such as command options "file" and "edit". The cursor 6 shown in FIG. 1a, which is under the control of the cursor cursor control means 20 has been positioned in close proximity to the command option 4 which is labelled as "Edit". The command items which correspond to the command option "Edit" may be displayed by the user's control of a signal generation means (e.g. a switch means 90) which is coupled to the computer controlled display system. For example, if a simple switch means such as that shown in U.S. Pat. No. Re. 32,632 (designated switch 90 in that patent) is used, the user would set the switch means in a second position (e.g. press down on the switch by pressing the switch cap 91) thereby signaling to the computer to display the menu window associated with the command option which has been selected.

Referring now to FIG. 1b, a display means 7 is shown as having a menu bar 3 and a menu window 1 (having command items 5 such as "File"; "Edit"; etc.) which has been "pulled-down" from the menu bar 3. FIG. 1b also shows the cursor 6, which is near the border 16 of the menu window 1. The menu bar 3 includes a plurality of command options 4 (e.g. "file"; "edit"; "Tj"; etc.). Imaginary dashed lines 11 have been added to FIGS. 1b and 2 to illustrate divisions between the command options shown in the menu bar 3 (it will be understood that the dashed lines are not typically part of the menu bar 3).

FIGS. 1a and 1b will be used to illustrate the operation of the "pull-down" menu. FIG. 1a illustrates the appearance of the display means 7 when no menu window has been "pulled-down" from the menu bar 3. In other words, no command option 4 has been selected in FIG. 1a. To select a particular command option 4, the user positions the cursor 6 on or near that particular command option (e.g. the cursor 6 is positioned near the command option "Edit" in FIG. 1a) and sets the switch means 90 to a second position, typically by pressing the switch cap 91 down to thereby set the switch means 90 in the second (down) position. This usually causes the "pull-down" of the menu window for that particular command option (thereby selected) to appear immediately below that particular command option. For example, as shown in FIG. 1b, the command items appearing in the menu window 1 for the command option "edit" appear immediately below the command option 4 which is labelled "edit". The command items 5 are typically arranged within user selectable areas of the menu window to permit the user to select a single command item from a particular menu window. The process for selecting a particular command item in the menu window (prior to removal) is described in more detail in U.S. Pat. No. Re. 32,632. It can be seen that a particular menu window when activated by pulling down the menu window from the menu bar will obscure a portion of the screen, thereby preventing the user from seeing that portion of the screen and the menu window simultaneously. This invention provides a method for removing the menu window from the menu bar and positioning that menu window on the screen in a user selectable location to permit the user to view portions of the screen which would not be viewable if the menu window was still attached to the menu bar. Moreover, the user may want the command items in the particular menu window to be constantly accessible without having to activate the command option in the menu bar 3 to cause the menu window to appear. It is these needs that the present invention attempts to address. Accordingly, a method for removing a menu window from a menu bar on a display means will be described.

The process of the invention will be described in conjunction with FIGS. 4a and 4b, which show, in flow chart form, the steps of the invention.

FIG. 4a shows the initial part of the method; initially, the computer controlled display system starts (step 100) by displaying the menu bar 3 (step 101) on the display means 7 as shown in FIG. 1a. The computer then determines (in step 102) whether the user has selected a command option in the menu bar by setting the switch means to a second position ("S=2") (or by manipulating other signal generation means to signal selection of a command option). If the user has not selected a command option in the menu bar the computer recirculates (back to step 101) and continues to display the menu bar 3. If the user selects a particular command option in the menu bar, the command items associated with that command option are displayed within a menu window (i.e. a pull-down menu is activated in step 103). Such a pull-down menu is shown in FIG. 1b for the command option "edit". The pull-down menu typically remains on the menu bar of display means 7 as long as the switch means is kept in the second position and the cursor 6 is kept within the border 16 of the menu window 1. Next, the computer checks for the selection of a command item by checking the position of the cursor 6 and checking the status of the switch means 90 (step 104). If the command item is selected by positioning the cursor near a particular command item and changing the switch means 90 from the second position to the first position, the computer performs the command item selected by the user (in step 105) and the computer recirculates back to the start of the sequence (step 101). If no command item has been selected, the computer determines (in step 106) whether the cursor 6 has crossed a border of the menu window. The cursor 6 in FIG. 1b is shown nearing a border 16 of the menu window 1. That border 16 corresponds to the side 1c of the menu window 1 shown in FIG. 1b. Menu window 1 has three sides labelled side 1a, side 1b and side 1c. Sides 1a and 1c are parallel vertical sides. Each side has associated therewith a border which extends a small distance "d" 15 from the border. As shown in FIG. 1b, the border 16 is typically parallel to its associated side and extends a perpendicular distance of "d" 15 from the repsective side; "d" may be any reasonable distance to allow for a margin of error in moving the cursor 6 across the display means 7. If no margin of error is necessary, "d" may be set equal to zero such that the border and its associated side will be the same.

To remove the menu window 1 from the menu bar 3 after causing the menu window (pull-down menu) to be displayed, the user keeps the the switch means 90 set at the second position while moving the cursor control means 20 such that the cursor 6 is moved from within the menu window to cross the border 16 of the menu window 1. Thus, the menu window 1 is removed from the menu bar 3 while the menu window 1 is being displayed on the display means 7. In the embodiment shown in FIG. 1b, the menu window 1 includes an edge 1d which is juxtaposed to the menu bar 3; crossing the edge 1d will not remove the menu window 1 from the menu bar 3 but will rather continue the selection of the command option "edit".

Referring again to FIG. 4a, if the cursor has not crossed the border of the menu window (i.e. the switch means is still set at S=2 and the cursor 6 is within the border of the menu window 1), the computer recirculates back to the pull-down menu being activated in step 103 as shown in FIG. 4a. On the other hand, if the cursor has crossed a border of the menu window 1, the computer then determines (in step 107) the location of the menu window, particularly with respect to the menu bar to prevent overlapping of the menu bar by the menu window. Overlapping of the menu bar should be prevented because the detached menu window will obscure command options on the menu bar if overlapping occurs. If there is overlap of the menu bar by the menu window, the menu window is not removed and the computer recirculates back to the step of the pull-down menu being activated (step 103). If there is no overlap of the menu bar by the menu window, the outline 9 of the menu window follows the cursor (step 108). In the preferred embodiment, a handle icon 2 and a close icon 8 are added to the menu window and the outline 9 of the menu window 1 with the handle icon and close box follows the cursor around the display means 7. As long as the user keeps the switch means 90 in the second position, the menu window 1 will follow the cursor around the display means 7 as long as there is no overlap of the menu bar 3 by the menu window 1.

FIG. 4a shows that while the outline of the menu window 1 follows the cursor 6 around the display means 7 (in step 108) the computer repeatedly checks to determine (in step 109) whether the detached menu 1 overlaps the menu bar 3 at the present location of the cursor 6. That is, while the menu window 1 follows the cursor 6 around (with the user maintaining a switch means 90 in the second position), the computer determines (in step 109) whether the detached menu window overlaps the menu bar. If the detached menu window overlaps the menu bar, then the computer causes the outline of the menu window to disappear (in step 110); then, the computer determines whether the user has selected another command option in step 111 (i.e. a command option other than the command option which was selected to pull-down the original menu window). If the user has not selected another command option, the computer returns to step 103 where the computer displays the menu window 1 as a pull-down menu attached to the menu bar 3. If the user has selected another command option the current pull-down menu which includes the original menu window 1 disappears (in step 112) and the computer recycles to the step 102 of determining whether the user has selected a command option in the menu bar 3. Referring again to step 109, if the menu window 1 does not overlap the menu bar 3, the computer then determines whether the movement of the menu window has stopped by determining (in step 113) the position of the switch means 90. If the switch means is still in the second position the menu window 1 will continue to follow the cursor 6 around the display means 7. As soon as the switch means 90 is set to the first position, (e.g. by releasing the button 91), the computer recognizes that the movement of the menu window has ceased and will immediately check for a menu bar overlap (in step 114). If there is no menu bar overlap then the pull-down menu showing the original menu window 1 attached to the menu bar 3 disappears and the computer proceeds into the remainder of the steps shown in FIG. 4b (through node 1). If there is a menu bar overlap at the end of the move, the outline of the menu window 1 disappears (in step 115) and the pull-down menu (i.e. the menu window is attached to the menu bar 3) disappears and the computer returns to start (step 116).

Referring now to FIG. 4b, once the computer has determined that the user has ended the move after "tearing off" the menu window from the menu bar 3, the computer in step 118 deposits the detached menu window 1 onto the display means 7. FIG. 2 shows the menu window 1 which has been deposited on the display means 7. The cursor 6 is shown as having been moved away from the menu window 1, and the display means 7 further includes a menu bar 3 having a plurality of command options 4. The menu window 1 includes command items 5 and further includes a handle icon 2 and a close icon 8. As shown in FIG. 2, the handle icon 2 may include the name of the command option which was selected when the menu window was removed.

After the computer deposits the detached menu window 1, such as the detached menu window 1 shown in FIG. 2, the computer checks to determine in step 119 whether an old detached menu window remains on the display means 7. If there is such as old detached menu window, then the computer in step 120 closes that old detached menu window, thereby removing it from the display means 7 so that it no longer appears on the display means 7. If there was no old detached menu window on the display means 7 when the detached menu window 1 was deposited on the display means 7, then the computer continues to the next step, step 121, shown on FIG. 4b. At this point, the computer determines in step 121 whether a command item in the detached menu window has been selected.

A command item 5 in the detached menu window 1 is typically selected by first positioning the cursor 6 over or near the particular command item 5 which the user seeks to select and then by signaling to the computer controlled display system that the item is selected through a signal generation means. The cursor 6 is, as described above, positioned on the display means 7 by manipulating the cursor control means 20 to cause corresponding movement of the cursor 6. FIG. 3a shows the cursor 6 positioned over the command item 5 which is labelled "Undo". Typically, after positioning the cursor 6 as described, the user signals the selection of the command item by first setting the switch means in a second position and then by setting the switch means to a first position. For example, on the cursor control means 20 of FIG. 1 (and of U.S. Pat. No. Re. 32,632), the user presses the button (switch cap 91) down to the second position and then releases the button which then (being spring loaded) pops up to the first position. Other means for signaling will be apparent to those skilled in the art.

If such a command item has been selected, the computer performs in step 122 the command item in the detached menu window and recirculates back to the beginning of step 121, in which the computer determines whether a command item in the detached menu window has been selected. If no command item in the detached menu window has been selected, the computer then determines in step 123 whether the user has selected a command option in the menu bar, which the computer usually continues to display since the start of the steps of the present invention as shown in FIG. 4a and 4b.

Referring to step 123 of FIG. 4b, the computer will determine whether the user has selected a command option in the menu bar 3. If the user has so selected a command option in the menu bar 3, the pull-down menu for that particular command option will be displayed and the command items in that pull-down menu will appear (step 124). The computer then moves to step 125, in which the computer determines whether a command item has been selected in the pull-down menu that has been just activated in the prior step 124. If a command item has been selected from the pull-down menu attached to the menu bar 3, the computer performs in step 126 that command item in the pull-down menu and continues to step 127. Referring again to step 125, if no command item has been selected in the pull-down menu attached to the menu bar 3, the computer proceeds to step 127, which determines whether the user desires to close the detached menu window. Referring again to step 123, if the user did not select a command option in the menu bar 3, the computer also proceeds to step 127 determining whether to close the detached menu window.

Referring again to step 127, the computer determines whether the user desires to close the detached menu window 1 by determining whether the position of the cursor 6 is over the area of the close icon 8 (which is shown in FIGS. 2, 3a and 3b as a rectangular area which overlaps the area of the handle icon 2) and whether, while the cursor 6 remains over the close icon 8, the switch position has been set to the second position (e.g. the switch means 90 has been pushed down) and then set to a first position (e.g. switch means 90 is released up). If all conditions of the foregoing are true, then the computer closes the detached menu window causing the detached menu window 1 to disappear from the display of the display means 7. The computer then proceeds back to start step 100 on FIG. 4a and recycles through the steps described above.

Continuing from step 127, if the user has not signaled the computer to close the detached menu window 1, then the computer determines in step 130 whether the user desires to move the menu window 1 around the screen of the display means 7. The computer determines whether the user desires to move the detached menu window 1 by determining whether, while the position of the cursor 6 is over the handle icon 2, the user has placed the switch means 90 in the second position; that is, the computer determines whether the user has manipulated the switch means 90 to place it in the second position while the cursor 6 is over the handle icon 2 as shown in FIG. 3b. If the cursor is not over the handle icon or the switch has not been set to the second position, then the computer returns to step 121 shown in FIG. 4b ("Has a command item in the detached menu window been selected?"). If the computer determines that the cursor is over the handle icon 2 and the switch position is set to the second position, then the computer proceeds to the next step (step 131) wherein the outline 9 of the detached menu window 1 follows the cursor 6 while the current detached menu window 1 remains displayed. The outline 9 of the menu window 1 will follow the cursor 6 as long as the user maintains the switch means 90 in the second position while moving the cursor control means 20 (e.g. a mouse). While the outline 9 of the detached menu window 1 follows the cursor 6 around the display means 7 as the cursor control means 20 is moved, the computer repeatedly checks for a menu bar overlap (e.g. in step 132). That is, the computer determines in step 132 whether, at the present position of the cursor 6, the outline 9 of the detached menu window 1 overlaps the menu bar 3. FIG. 5 shows the outline 9 of the detached menu window 1 and shows the cursor 6 being positioned over the area enclosed by the outline 9 of the detached menu window 1. If no portion of the outline 9 of the menu window 1 overlaps with the menu bar 3 (i.e. no menu bar overlap) then the computer determines in step 133 whether the user desires to end the move of the detached menu window 1. At this step 133, the computer determines whether the switch means is in the second position; if it is, then the computer recirculates back to step 131 where the outline 9 of the detached menu window 1 follows the cursor 6. That is, in a typical embodiment, the user signals to the computer that the user desires to continue moving the outline of the detached menu window 1 by keeping the switch means 90 set to the second position. If, on the other hand, the switch means 90 has been set to the first position, then the computer deposits (in step 118) the detached menu window at the location corresponding to the position of the outline 9 when the computer found in step 133 that the switch means was set to the first position. The last position of the cursor 6 typically determines where the outline 9 was when step 133 is executed. The computer controlled display system will also remove the outline 9 from the display means 7 after depositing the detached menu window at the new location. In this case, the user signals to the computer that the user has finished moving the outline 9 of the detached menu window 1 by setting the switch means 90 to the first position. The computer then proceeds to the next step (step 119) shown in FIG. 4b.

If, while moving the outline 9 of the menu window 1 with the cursor 6, there is a menu bar overlap, then the computer performs certain operations shown in FIG. 4b (i.e. the steps labelled 134, 135, 136, 137 and 138). In particular, if there is a menu bar overlap, the outline 9 of the detached menu window 1 disappears but the current detached menu window 1 is still displayed on the display means 7 (in step 134). The computer then proceeds to step 135 wherein the computer determines whether there is (still) a menu bar overlap; if there is (at this time) no menu bar overlap (e.g. the cursor has been moved away from the menu bar 3 to eliminate the overlapping of the outline 9 of the detached menu window 1 with the menu bar 3) then the computer proceeds to step 138 in which it causes the outline 9 of the detached menu window 1 to reappear and the outline of the detached menu window follows the cursor 6. Following step 138 the computer then proceeds to step 133 in which it tests if the user has finished moving the menu window 1 by examining the status of the switch means. Referring again to step 135, if the menu bar overlap continues (i.e. menu bar overlap still exists when tested in step 135) then the computer next determines in step 136 whether the moving of the detached menu window is completed. If (in step 136) the end of the movement of detached menu window 1 has not been reached the computer recycles back to step 135 to determine whether there is a menu bar overlap. The computer tests for the end of the movement of the detached menu window by checking the status of the switch means 90; in particular, if in step 136 the computer finds that the switch means 90 is in the second position, then the computer determines that the user is still attempting to move the outline 9 of the detached menu window. On the other hand, if in step 136, the switch means 90 is in the first position, then the computer determines that the user has stopped trying to move the outline 9, and the computer will proceed to step 137. If, in step 136, the user has indicated that the moving of the menu window is over (by setting the switch means 90 to the first position), the computer proceeds to step 137 and will not relocate the detached menu window and will continue to display the current detached menu window (since the computer last determined that there was a menu bar overlap). Following step 137, the computer proceeds back to step 121 to determine whether a command item in the detached menu window 1 has been selected.

The foregoing description describes the operation of the present invention as embodied in the preferred embodiment of the invention, a computer program marketed under the name "HyperCard" which is sold by the assignee of the present invention, Apple Computer, Inc. for use on the Macintosh series of computers. Many alternative embodiments will be recognized by those skilled in the art upon reference to this disclosure. For example, the name of the command option may appear in the handle icon as shown in FIG. 2. Moreover, multiple switches may be used as the signal generation means; for example, three separate switches may be used: one for pulling down and removing a menu window; a second for closing a detached menu window; and a third for moving a detached menu window. As another example, an alternative embodiment shown in FIG. 6 will now be described.

FIG. 6 represents an alternative embodiment of the present invention in which the menu bar 12 is located in the proximity of the middle of the display means 7. The menu bar 12, which may be located in many different positions, includes command options 4, labelled diagrammatically T1, T2, etc. Dashed lines 11 are used to illustrate the demarcations between one predetermined area associated with and corresponding to one command option and another predetermined area associated with and corresponding to another command option. The menu 12 operates in the same fashion as the menu bar 3 and in the same fashion as the menu bar and display system described in U.S. Pat. No. Re. 32,632. However, due to the change in location of the menu bar 12 (relative to the menu bar 3) it is now possible to "tear off" (i.e. remove) a menu window not only from the side of the menu window 10 (such as sides 10a, 10b or 10c) but also on the border 13 of menu window 10 which is above the menu bar 12. For example, the menu window 10 may be removed from the menu bar 12 by manipulating the cursor control means 20 and the signal generation means such that the cursor 6 is caused to cross a border associated with a particular side 10a, 10b or 10c of the menu window, when, at the same time, the signal generation means indicates to the computer controlled display system that the menu window should be removed. It is also possible to remove the menu window 10 by causing the cursor to move across the border 13 above the menu bar 12 with the signal generation means set to indicate to the computer controlled display system that the menu window is to be removed from the menu bar.

The foregoing method of the present invention may conveniently be implemented in a computer program that is based upon the flow chart in FIGS. 4a and 4b. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes. For example, those skilled in the art will recognize that a computer program (based on the flow chart in FIGS. 4a and 4b) for the Macintosh series of computers may be simplified by using presently existing routines ("tools"), such as the Window Manager, which routines are described in the reference manuals entitled Inside Macintosh, which are published by the Addison-Wesley Publishing Company, Inc.

While the present invention has been specifically described with reference to FIGS. 1a-7, and with emphasis on certain computer controlled display systems, it should be understood that the figures are for illustration only and should not be taken as limitations upon the invention. It is contemplated that many changes and modifications may be made, by one of ordinary skill in the art, to the apparatus and method of the present invention without departing from the spirit and scope of the invention as claimed below.

I claim:

1. In a computer controlled display system having a display wherein a command option is displayed along a menu bar and command items corresponding to said command option are displayed once said command option has been selected, said command items being displayed within a menu window having a border, a method for removing said menu window from said menu bar comprising the steps of:

generating and displaying said menu bar having said command option;

positioning a cursor on said display using a cursor control means, the manipulation of said cursor control means by a user resulting in a corresponding movement of said cursor on said display;

displaying said menu window by selecting said command option, said command option being selected by said user's control of a signal generation means being coupled to said computer controlled display system;

removing said menu window from said menu bar while displaying said menu window by manipulating said cursor control means so as to move said cursor across said border, whereby said menu window may be removed from said menu bar.

2. In a computer controlled display system having a display means wherein a plurality of command options are displayed along a menu bar and command items corresponding to each command option are displayed once said command option has been selected, said command items corresponding to each command option being displayed within a menu window being defined by a first edge being juxtaposed to said menu bar and by at least two sides, a method for removing said menu window from said menu bar and manipulating said menu window on said display means, said method comprising the steps of:

generating and displaying said menu bar having said plurality of command options;

positioning a cursor on said display means using a cursor control means, the movement of said cursor control means by a user resulting in a corresponding movement of said cursor on said display means;

displaying said menu window by placing said cursor over said command option and selecting said command option, said user selecting said command option by placing a switch means coupled to said display system in a second position while positioning said cursor over a first predetermined area on said display corresponding to said command option;

removing said menu window from said menu bar while displaying said menu window by keeping said switch means in said second position while moving said cursor across one of said sides, said menu window following said cursor around said display means while said switch means is in said second position, said menu window being positioned on said display at a user selected position when said switch means is changed from said second position to a first position, whereby said menu window may be removed from said menu bar and positioned on said display by said user.

3. A method as defined in claim 2 wherein once said menu window has been removed from said menu bar, said menu window further comprises a handle icon for moving said menu window, said handle icon having a second predetermined area in said menu window, said user moving said menu window by positioning said cursor over said second predetermined area and placing said switch means in said second position and then moving said cursor around said display, said menu window following said cursor around said display means until said switch is placed in said first position, said menu window being positioned on said display means where said menu window was located when said switch was placed in said first position, whereby said menu window may be moved around said display means after said menu window has been removed from said menu bar.

4. A method as defined in claim 3 wherein once said menu window has been removed from said menu bar, said menu window further comprises a close icon for closing said menu window to cause said menu window to disappear from said display, said close icon having a third predetermined area in said menu window, said user closing said menu window by positioning said cursor over said third predetermined area while placing said switch means in said second position and then placing said switch in said first position thereby causing said menu window to close and disappear from said display, whereby said menu window after it has been removed from said menu bar may be deleted from said display.

5. A method as defined in claim 2 wherein said menu window before being removed from said menu bar is defined by said first edge and by three sides of said menu window and wherein said menu window is removed from said menu bar by keeping said switch in said second position while moving said cursor across one of said three sides of said menu window.

6. A method as defined in claim 5 wherein said cursor control means is a mouse.

7. A method as defined in claim 5 wherein said cursor control means is a mouse having said switch means.

8. In a computer system, a computer controlled display system for providing an interface with a user of said computer system, said computer controlled display system comprising:

a display means for producing a display having a plurality of command options displayed along a menu bar and for producing command items corresponding to each command option once said command option has been selected, said command items corresponding to each command option being displayed when said command option is selected within a menu window having a first edge being juxtaposed to said menu bar and having sides and having a border corresponding to said sides of said menu window;

a cursor control means coupled to said computer controlled display system, said cursor control means controlling the position of a cursor on said display;

a switch means coupled to said computer controlled display system, said switch means having a first position and a second postion, said switch means for selecting said command option by setting said switch means in said second position while positioning said cursor over a first predetermined area on said display corresponding to said command option, thereby causing said menu window to be displayed, said menu window being removed from said menu bar by keeping said switch means in said second position while moving said cursor across said border, said menu window following said cursor around said display while said switch means is in said second position, said menu window being positioned on said display at a user selected position when said switch means is changed from said second position to a first position, whereby said menu window may be removed from said menu bar and positioned on said display by said user.

9. A computer controlled display system as defined in claim 8 wherein once said menu window has been removed from said menu bar, said menu window further comprises a handle icon for moving said menu window, said handle icon having a second predetermined area in menu window, said user moving said menu window by positioning said cursor over said second predetermined area and placing said switch means in said second position and then moving said cursor, thereby dragging said menu window with said cursor around said display until said switch means is placed in said first position, said menu window being positioned on said display where said menu window was located when said switch means was placed in said first position, whereby said menu window may be moved around said display after said menu window has been removed from said menu bar.

10. A computer controlled display system as defined in claim 9 wherein once said menu window has been removed from said menu bar, said menu window further comprises a close icon for closing said menu window to cause said menu window to disappear from said display, said close icon having a third predetermined area in said menu window, said user closing said menu window by positioning said cursor over said third predetermined area while placing said switch means in said second position and then placing said switch means in said first position thereby causing said menu window to close and disappear from said display, whereby said menu window after it has been removed from said menu bar may be deleted from said display.

11. In a computer controlled display system having a display wherein a command option is displayed along a menu bar and command items corresponding to said command option are displayed once said command option has been selected, said command items being displayed within a menu window having at least two sides and having a border associated with at least one of said two sides of said menu window, a method for removing said menu window from said menu bar comprising the steps of:

generating and displaying said menu bar having said command option;

positioning a cursor on said display using a cursor control means, the manipulation of said cursor control means by a user resulting in a corresponding movement of said cursor on said display;

displaying said menu window by placing said cursor over said command option and selecting said command option by setting a switch means in a second position while positioning said cursor over a first predetermined area on said display corresponding to said command option, said switch means having a first position and said second position and being coupled to said computer controlled display system;

removing said menu window from said menu bar while displaying said menu window by keeping said switch means in said second position while moving said cursor across said border, said menu window following said cursor around said display while said switch means is in said second position, said menu window being positioned on said display at a user selected position when said switch is changed from said second position to said first position, whereby said menu window may be removed from said menu bar and positioned on said display by said user.

12. A method as defined in claim 11, wherein said menu window has three sides and said border of said menu window before being removed from said menu bar is defined by said three sides of said menu window and wherein said menu window is removed from said menu bar by keeping said switch in said second position while moving said cursor across one of said three sides of said menu window.

* * * * *